United States Patent
Iwanaga et al.

(12)

(10) Patent No.: US 7,069,040 B2
(45) Date of Patent: Jun. 27, 2006

(54) MOBILE COMMUNICATION TERMINAL, BROADCAST INFORMATION STORING METHOD, CELL TRANSFER METHOD, AND MOBILE COMMUNICATION SYSTEM

(75) Inventors: Mitsuo Iwanaga, Yokohama (JP); Takehiro Ida, Yokosuka (JP); Kazufumi Yunoki, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 619 days.

(21) Appl. No.: 10/291,774

(22) Filed: Nov. 12, 2002

(65) Prior Publication Data

US 2003/0092375 A1    May 15, 2003

(30) Foreign Application Priority Data

Nov. 13, 2001    (JP)    ............................. 2001-347863

(51) Int. Cl.
*H04Q 7/20*    (2006.01)
*H04Q 7/00*    (2006.01)
*H04B 7/00*    (2006.01)

(52) U.S. Cl. ...................... 455/525; 455/437; 455/436; 455/439; 455/444; 370/331; 370/332

(58) Field of Classification Search ................ 455/437, 455/436, 439, 443, 444, 525; 370/331, 332
See application file for complete search history.

(56) References Cited

U.S. PATENT DOCUMENTS 6,434,389 B1 *   8/2002   Meskanen et al. .......... 455/437
2003/0040313 A1 *   2/2003   Hogan et al. ................ 455/435

FOREIGN PATENT DOCUMENTS

| JP | 7-312771 | 11/1995 |
|---|---|---|
| JP | 2001-309419 | 11/2001 |
| WO | WO 99/13670 | 3/1999 |
| WO | WO 99/60794 | 11/1999 |
| WO | WO 00/36853 | 6/2000 |

* cited by examiner

*Primary Examiner*—Quochien B. Vuong
*Assistant Examiner*—Yuwen Pan
(74) *Attorney, Agent, or Firm*—Oblon, Spivak, McClelland, Maier & Neustadt, P.C.

(57) ABSTRACT

A mobile phone 1 according to the present invention stores first broadcast information received from a base station B1, in correspondence with first cell information in a storage unit 5. When the mobile phone 1 receives second cell information from a base station B2, it determines whether there is previously stored cell information identical with the second cell information, in a cell information storage table 51. When the result of the determination is that it is stored, the mobile phone 1 reads out the first broadcast information and transfers to a cell according to the first broadcast information. When it is not stored, the mobile phone receives second broadcast information and transfers to a cell according to the second broadcast information. Namely, the mobile phone 1 makes the cell transfer according to minimum data within a range in which a cell as a potential transfer target can be identified.

23 Claims, 11 Drawing Sheets

*Fig.8*

| SCRAMBLING CODE | VALUE-TAG | ELAPSED TIME |
|---|---|---|
| #1 | #A | 30 |
| #2 | #B | 28 |
| #3 | #B | 15 |
| #2 | #D | 10 |
| #2 | #D | 8 |

MOBILE COMMUNICATION TERMINAL, BROADCAST INFORMATION STORING METHOD, CELL TRANSFER METHOD, AND MOBILE COMMUNICATION SYSTEM

BACKGROUND OF THE INVENTION

1. Field of the Invention

The present invention relates to a mobile communication terminal, a broadcast information storing method, a cell transfer method, and a mobile communication system.

2. Related Background Art

Conventionally, the mobile communication terminals including mobile telephones are configured to receive broadcast information from a base station at a transit place on the occasion of movement between reaches of radio waves (which will be referred to hereinafter as "cells") from one base station. The broadcast information is information about a cell as a potential transfer target. The mobile communication terminals are configured to select a cell of a transfer target and transfer to the cell, based on the broadcast information received in a cell as a potential transfer target.

SUMMARY OF THE INVENTION

The above prior art, however, had the following imperfection. Namely, a mobile communication terminal on standby or in communication receives all the broadcast information about a cell as a potential transfer target every cell transfer. Accordingly, for example, in the case where, after a transfer from a first cell to a second cell, the mobile communication terminal returns to the first cell, it again receives all the broadcast information despite no change in the broadcast information of the first cell. As a result, the mobile communication terminal wastes the receiving time of the broadcast information and the cell transfer time and increases its power consumption.

The present invention has been accomplished in view of the above circumstances and an object of the invention is to provide a mobile communication terminal, a broadcast information storing method, a cell transfer method, and a mobile communication system succeeding in reducing the cell transfer time and the power consumption.

The present invention will become more fully understood from the detailed description given herein below and the accompanying drawings which are given by way of illustration only, and thus are not to be considered as limiting the present invention.

A mobile communication terminal according to the present invention is characterized by comprising broadcast information storing means for storing a plurality of broadcast information items received on the occasion of cell transfers in a historical way.

A broadcast information storing method according to the present invention is characterized by comprising a broadcast information storing step of storing a plurality of broadcast information items received on the occasion of cell transfers, in a historical way.

According to these aspects of the invention, a plurality of broadcast information items received on the occasion of cell transfers are stored in a historical way. Therefore, if there is previously stored broadcast information identical with broadcast information of a cell selected as a potential transfer target by the mobile communication terminal, the mobile communication terminal can reuse the previously stored broadcast information. As a consequence, it becomes feasible to decrease the cell transfer time and the power consumption, as compared with the case of receiving all the data included in the broadcast information.

Preferably, the broadcast information storing means stores the plurality of broadcast information items in a historical way in correspondence with a plurality of cell identifying information items for identifying respective cells.

Preferably, the broadcast information storing step is to store the plurality of broadcast information items in a historical way in correspondence with a plurality of cell identifying information items for identifying respective cells.

According to these aspects of the invention, a plurality of broadcast information items received on the occasion of cell transfers are stored in a historical way in correspondence with information items to identify respective cells (e.g., scrambling codes). Therefore, if there is previously stored information identical with information to identify a cell selected as a potential transfer target by the mobile communication terminal, it can reuse broadcast information corresponding to the identical information. Namely, the mobile communication terminal is able to identify the broadcast information to be reused, before receiving the broadcast information. As a consequence, it becomes feasible to decrease the cell transfer time and the power consumption, as compared with the case of identifying the broadcast information after receiving part of the broadcast information.

A mobile communication terminal according to the present invention is characterized by comprising: cell information storing means for storing a plurality of broadcast information items received on the occasion of cell transfers, in a historical way in correspondence with a plurality of cell identifying information items for identifying respective cells; cell information receiving means for receiving a cell identifying information item for identifying a cell; identity determining means for determining whether one of the plurality of cell identifying information items stored in said cell information storing means is identical with the cell identifying information item received by said cell information receiving means; broadcast information acquiring means for, when said identity determining means determines that one of the plurality of cell identifying information items stored in said cell information storing means is identical with the cell identifying information item received by said cell information receiving means, acquiring a broadcast information item corresponding to the cell identifying information item determined as identical, from said cell information storing means; and cell transfer means for carrying out a transfer to the cell, based on the broadcast information item acquired by said broadcast information acquiring means.

A cell transfer method according to the present invention is a cell transfer method of carrying out a cell transfer of a mobile communication terminal while receiving broadcast information from a base station, said cell transfer method comprising: a cell information storing step of storing a plurality of broadcast information items received on the occasion of cell transfers, in a historical way in storing means, in correspondence with a plurality of cell identifying information items for identifying respective cells; a cell information receiving step of receiving cell identifying information for identifying a cell; an identity determining step of determining whether one of the plurality of cell identifying information items stored in said cell information storing step is identical with the cell identifying information item received in said cell information receiving step; a broadcast information acquiring step of, when said identity determining step results in determining that one of the plurality of cell identifying information items stored in said cell information storing step is identical with the cell identifying information item received in said cell information receiving step, acquiring a broadcast information item corresponding to the cell identifying information item determined as identical, from said storing means; and a cell transfer step of carrying out a transfer to the cell, based on the broadcast information item acquired in said broadcast information acquiring step.

According to these aspects of the invention, a plurality of broadcast information items received by the mobile communication terminal are stored in a historical way in correspondence with a plurality of cell identifying information items (e.g., scrambling codes). When the mobile communication terminal receives a cell identifying information item, it determines whether there is a previously stored cell identifying information item identical with the received cell identifying information item. When the result of the determination is that it is stored, the mobile communication terminal reads out broadcast information corresponding thereto and transfers to the cell according to the broadcast information. Namely, the mobile communication terminal reuses the broadcast information received in the past, whereby it can transfer to the cell without receiving all the broadcast information. Accordingly, it becomes feasible to perform a quicker cell transfer, as compared with the case where the mobile communication terminal transfers after receiving the whole of the broadcast information. It is also feasible to decrease the time of use of a data reception channel and thus reduce the power consumption of the mobile communication terminal.

The mobile communication terminal identifies the broadcast information to be used, without receiving part of the broadcast information. Accordingly, it is feasible to decrease the time for identification of the broadcast information, as compared with the case of identifying the broadcast information to be used, based on part of the broadcast information. As a consequence, it becomes feasible to decrease the data reception time and achieve a quicker cell transfer. It is also feasible to decrease the time of use of the data reception channel and the power consumption of the mobile communication terminal.

A mobile communication terminal according to the present invention is characterized by comprising: cell information storing means for storing a plurality of broadcast information items received on the occasion of cell transfers, in a historical way; cell information receiving means for receiving a portion of a broadcast information item about a cell; identity determining means for determining whether a portion of one of the plurality of broadcast information items stored in said cell information storing means is identical with the portion of the broadcast information item received by said cell information receiving means; broadcast information acquiring means for, when said identity determining means determines that a portion of one of the plurality of broadcast information items stored in said cell information storing means is identical with the portion of the broadcast information received by said cell information receiving means, acquiring a broadcast information item having said portion determined as identical, from said cell information storing means; and cell transfer means for carrying out a transfer to the cell, based on the broadcast information item acquired by said broadcast information acquiring means.

A cell transfer method according to the present invention is a cell transfer method of carrying out a cell transfer of a mobile communication terminal while receiving broadcast information from a base station, said cell transfer method comprising: a cell information storing step of storing a plurality of broadcast information items received on the occasion of cell transfers, in a historical way in storing means; a cell information receiving step of receiving a portion of a broadcast information item about a cell; an identity determining step of determining whether a portion of one of the plurality of broadcast information items stored in said cell information storing step is identical with the portion of the broadcast information received in said cell information item receiving step; a broadcast information acquiring step of, when said identity determining step results in determining that a portion of one of the plurality of broadcast information items stored in said cell information storing step is identical with the portion of the broadcast information item received in said cell information receiving step, acquiring a broadcast information item having said portion determined as identical, from said storing means; and a cell transfer step of carrying out a transfer to the cell, based on the broadcast information item acquired in said broadcast information acquiring step.

According to these aspects of the invention, the plurality of broadcast information items received by the mobile communication terminal are stored in a historical way. Receiving a portion of a broadcast information item, the mobile communication terminal determines whether there is previously stored information identical with the portion of the broadcast information item. When the result of the determination is that it is stored, the mobile communication terminal reads out broadcast information corresponding thereto and transfers to the cell according to this broadcast information. Namely, the mobile communication terminal reuses the broadcast information, whereby it can transfer to the cell without receiving the whole of the broadcast information. Accordingly, it becomes feasible to achieve a quicker cell transfer, as compared with the case where the mobile communication terminal transfers to the cell while receiving the whole of the broadcast information.

It is also feasible to decrease the time of use of the data reception channel and the power consumption of the mobile communication terminal. The mobile communication terminal identifies the broadcast information to be used, based on part of the broadcast information already received. Accordingly, the broadcast information can be precisely identified, as compared with the case of identifying the broadcast information to be used, based on the cell identifying information.

A mobile communication terminal according to the present invention is characterized by comprising: cell information storing means for storing a plurality of broadcast information items received on the occasion of cell transfers, in a historical way in correspondence with a plurality of cell identifying information items for identifying respective cells; cell information receiving means for receiving a cell identifying information item for identifying a cell, and a portion of a broadcast information item about the cell; identity determining means for determining whether one pair out of the plurality of cell identifying information items and portions of the plurality of broadcast information items stored in said cell information storing means are identical with the cell identifying information items and the portion of the broadcast information item received by said cell information receiving means; broadcast information acquiring means for, when said identity determining means determines that one pair out of the plurality of cell identifying information items and the portions of the plurality of broadcast information items stored in said cell information storing means are identical with the cell identifying information item and the portion of the broadcast information item received by said cell information receiving means, acquiring a broadcast information item corresponding to the cell identifying information item stored in said cell information storing means, from said cell information storing means; and cell transfer means for carrying out a transfer to the cell, based on the broadcast information item acquired by said broadcast information acquiring means.

A cell transfer method according to the present invention is a cell transfer method of carrying out a cell transfer of a mobile communication terminal while receiving broadcast information from a base station, said cell transfer method comprising: a cell information storing step of storing a plurality of broadcast information items received on the occasion of cell transfers, in a historical way in storing means, in correspondence with a plurality of cell identifying information items for identifying respective cells; a cell information receiving step of receiving a cell identifying information item for identifying a cell, and a portion of a broadcast information item about the cell; an identity determining step of determining whether one pair out of the plurality of cell identifying information items and portions of the plurality of broadcast information items stored in said cell information storing step are identical with the cell identifying information item and the portion of the broadcast information item received in said cell information receiving step; a broadcast information acquiring step of, when said identity determining step results in determining that one pair out of the plurality of cell identifying information items and the portions of the plurality of broadcast information items stored in said cell information storing step are identical with the cell identifying information item and the portion of the broadcast information item received in said cell information receiving step, acquiring a broadcast information item corresponding to the cell identifying information item stored in said cell information storing step, from said storing means; and a cell transfer step of carrying out a transfer to the cell, based on the broadcast information item acquired in said broadcast information acquiring step.

According to these aspects of the invention, a plurality of broadcast information items received by the mobile communication terminal are stored in a historical way in correspondence with a plurality of cell identifying information items (e.g., scrambling codes). When the mobile communication terminal receives a cell identifying information item and a portion of a broadcast information item, it determines whether there is previously stored information identical with both the cell identifying information item and the portion of the broadcast information item. When the result of the determination is that it is stored, the mobile communication terminal reads out broadcast information corresponding thereto and transfer to the cell according to this broadcast information. Namely, the mobile communication terminal reuses the broadcast information, whereby it can transfer to the cell without receiving the whole of the broadcast information. Accordingly, it becomes feasible to achieve a quicker cell transfer, as compared with the case where the mobile communication terminal transfers to the cell while receiving the whole of the broadcast information. It is also feasible to decrease the time of use of the data reception channel and the power consumption of the mobile communication terminal.

The mobile communication terminal identifies the broadcast information to be used, based on the cell identifying information item and the part of the broadcast information item already received. Accordingly, it is feasible to identify the broadcast information more precisely, as compared with the case of identifying the broadcast information to be used, based on either one of the cell identifying information item and the portion of the broadcast information item.

Furthermore, when there is no stored cell identifying information item identical with the received cell identifying information item, the mobile communication terminal determines that there is no identical broadcast information, at the time of receiving the cell identifying information item, and then receives the whole of the broadcast information. Accordingly, there is no need for performing a process of determining the identity of part of broadcast information, so that waste data reception is avoided, as compared with the case where the cell identifying information is not used for the determination of identity. It is also feasible to curtail the time for the waste data reception.

In the mobile communication terminal according to the present invention, preferably, said cell information storing means stores a plurality of broadcast information items received on the occasion of cell transfers, in a historical way in correspondence with elapsed times since received, and said broadcast information acquiring means is configured so that when an elapsed time as mentioned is within a predetermined time, the acquiring means acquires a broadcast information item corresponding to said elapsed time, from said cell information storing means.

In the cell transfer method according to the present invention, preferably, said cell information storing step is to store a plurality of broadcast information items received on the occasion of cell transfers, in a historical way in correspondence with elapsed times since received, and said broadcast information acquiring step is to, when an elapsed time as mentioned is within a predetermined time, acquire a broadcast information item corresponding to said elapsed time.

According to these aspects of the invention, a plurality of broadcast information items received by the mobile communication terminal are stored in a historical way in correspondence to elapsed times since received. When the mobile communication terminal receives a cell identifying information item or a portion of a broadcast information item, it reads out a broadcast information item satisfying conditions that at least either information is identical and that the elapsed time is within the predetermined time, and transfers to the cell according to this broadcast information item. Namely, the mobile communication terminal does not use the broadcast information whose elapsed time is over the predetermined time. Accordingly, in the case where the mobile communication terminal makes a transfer to a cell that is different from those stored but is identical in either a cell identifying information item or a portion of a broadcast information item with a certain cell, it is feasible to prevent the mobile communication terminal from making a wrong decision that the transfer is one to the identical cell.

In the mobile communication terminal according to the present invention, preferably, each of the portions of the broadcast information items stored in said cell information storing means and the portion of the broadcast information item received by said cell information receiving means is information by which it can be determined whether the broadcast information item has been changed.

In the cell transfer method according to the present invention, preferably, each of the portions of the broadcast information items stored in said cell information storing step and the portion of the broadcast information received in said cell information receiving step is information by which it can be determined whether the broadcast information item has been changed.

According to these aspects of the invention, each of the portions of the broadcast information items stored and the portion of the broadcast information item received is information by which it can be determined whether the broadcast information item has been changed (e.g., value-tag). Accordingly, when the broadcast information about the same cell varies with time, the mobile communication terminal is able to readily determine the change of the broadcast information. This makes it feasible to quickly make a decision that the whole of the broadcast information should be received. As a consequence, it becomes feasible to perform a quicker cell transfer.

In the mobile communication terminal according to the present invention, preferably, each of the portions of the broadcast information items stored in said cell information storing means and the portion of the broadcast information received by said cell information receiving means is identification information of a cell.

In the cell transfer method according to the present invention, preferably, each of the portions of the broadcast information items stored in said cell information storing step and the portion of the broadcast information item received in said cell information receiving step is identification information of a cell.

According to these aspects of the invention, each of the portions of the broadcast information items stored and the portion of the broadcast information item received is identification information of a cell (e.g., cell ID). Accordingly, the identity of a cell can be discriminated readily. As a consequence, it becomes feasible to perform the determination of the identity of broadcast information more accurately.

Furthermore, the invention may also be constructed or implemented as a mobile communication system comprising: the mobile communication terminal as set forth; and a base station for transmitting at least one out of cell identifying information and a portion of broadcast information, to said mobile communication terminal, wherein communication is established between said mobile communication terminal and said base station.

According to the present invention, a plurality of broadcast information items received at the mobile communication terminal are stored in correspondence with a plurality of cell identifying information items. When the mobile communication terminal receives cell identifying information, it determines whether there is previously stored information identical with the cell identifying information. When the result of the determination is that there is previously stored information identical with the cell identifying information, the mobile communication terminal reads out the broadcast information corresponding to the received cell identifying information and transfers to the cell according to this broadcast information. Namely, the mobile communication terminal reuses the broadcast information, thereby transferring to the cell without receiving the whole of the broadcast information. Accordingly, it becomes feasible to make the quicker cell transfer, as compared with the case of the mobile communication terminal transferring to the cell while receiving the whole of the broadcast information. The time of use of the data reception channel becomes shorter and the power consumption of the mobile communication terminal is reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 8 is a diagram showing a data storage example inside the cell information storage table 51 in the second embodiment.

DESCRIPTION OF THE PREFERRED EMBODIMENTS

First Embodiment

A mobile communication system 100 in a first embodiment of the present invention will be described below in detail with reference to the accompanying drawings. The broadcast information will be described as a premise of description of construction and operation. The broadcast information consists of a plurality of data. In order to make clear distinction between individual data as constitutive entities of the broadcast information and the entire data as an aggregate, the former will be referred to as "broadcast information constituent data" and the latter as "broadcast information."

Figure 1:
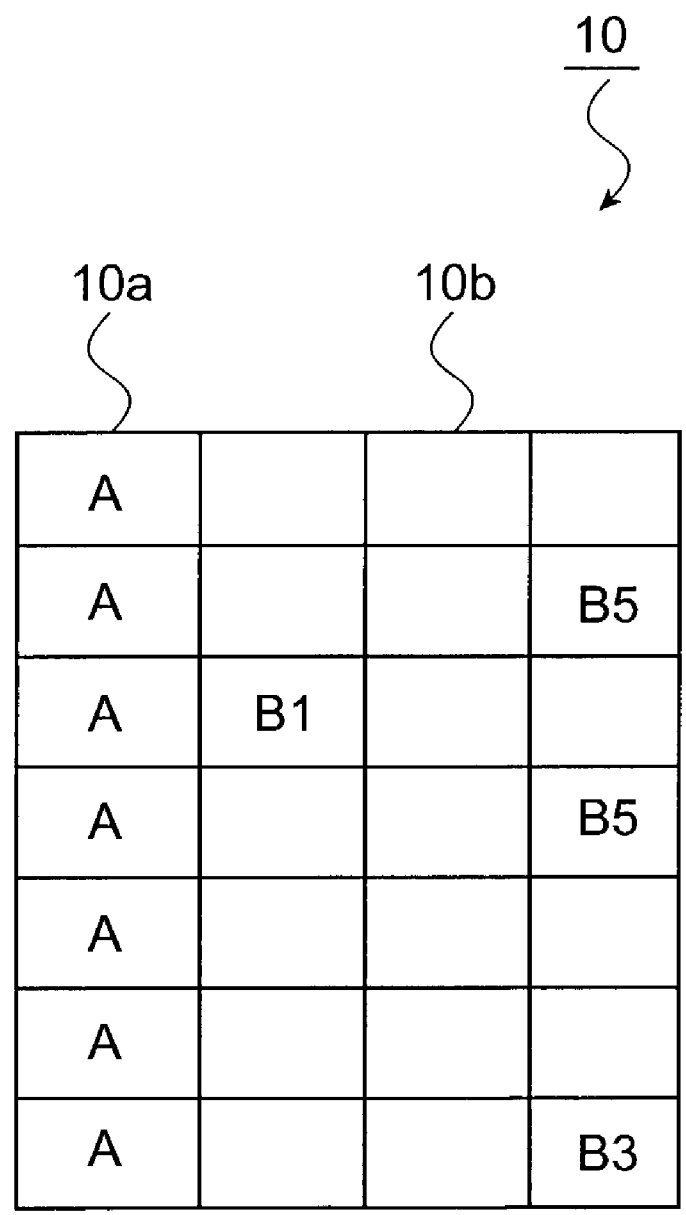
FIG. 1 is a schematic diagram showing a configuration example of broadcast information 10.

FIG. 1 is a schematic diagram showing a configuration example of broadcast information 10. As shown in FIG. 1, the broadcast information 10 is comprised of a broadcast information constituent data A group 10a and a broadcast information constituent data B group 10b. The broadcast information constituent data A group 10a is composed of a plurality of broadcast information constituent data A indicated by A's in the drawing. The broadcast information constituent data B group 10b is composed of a plurality of broadcast information constituent data B indicated by B1, B3, and B5 in the drawing.

More particularly, the broadcast information constituent data A is transmitted at constant intervals (e.g., 80 ms) and includes data of a carrier code, a value-tag, schedule information, and so on. The carrier code is data uniquely allocated to each carrier, in order to discriminate a carrier exercising control over a base station, from others. The value-tag is data for determining whether a change has been made in the data contents of the broadcast information. The schedule information is information indicating arrangement of the broadcast information constituent data B.

The broadcast information constituent data B is eighteen types of data of different attributes, which have different transmission intervals according to their attributes. B1 as a type of the broadcast information constituent data B is broadcast information including a cell ID. The cell ID is data allocated to each cell, in order to discriminate a cell in which the broadcast information is transmitted, from others.

Figure 2:
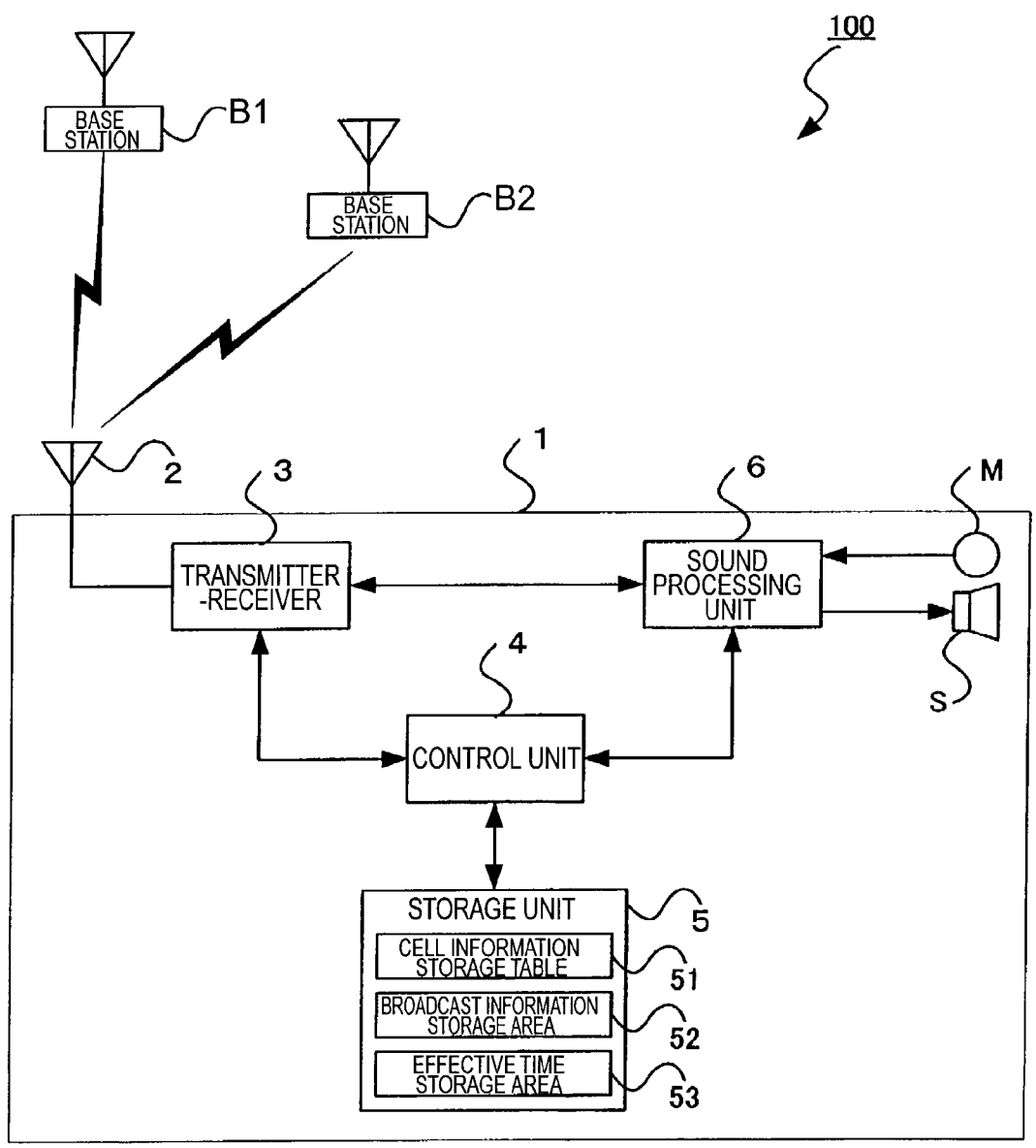
FIG. 2 is a schematic diagram showing an example of the overall configuration of mobile communication system 100.

The configuration of the mobile communication system 100 will be described below. FIG. 2 is a schematic diagram showing the overall configuration of the mobile communication system 100 according to the present invention, and a functional configuration of mobile telephone 1. As shown in FIG. 2, the mobile communication system 100 is configured so that the mobile phone 1, base station B1, and base station B2 are connected in a mutually communicable state through radio communication lines. The base station B1 is a known base station having a first cell as a communication area, and the base station B2 a known base station having a second cell as a communication area.

As shown in FIG. 2, the mobile phone 1 is comprised of an antenna 2, a transmitter-receiver 3 (corresponding to the cell information receiving means), a control unit 4 (corresponding to the identity determining means, broadcast information acquiring means, and cell transfer means), a storage unit 5 (corresponding to the broadcast information storing means and the cell information storing means), a sound processing unit 6, a speaker S, and a microphone M, which are connected through buses so as to enable input/output of various signals.

Each of the components will be described below in detail. The antenna 2 is telescopically mounted in the upper part of the case of the mobile phone 1 and is configured to send and receive signals in a predetermined frequency band to and from the base stations B1, B2. In reception, the antenna 2 feeds signals received from the base stations B1, B2, to the transmitter-receiver 3. In transmission, on the other hand, it puts signals from the transmitter-receiver 3 on a carrier wave of the predetermined frequency band and sends them to the base stations B1, B2.

The transmitter-receiver 3 has a modulator-demodulator for modulation and demodulation of signal and a coder-decoder for coding and decoding of signal. In reception, the modulator-demodulator performs a process of demodulating an input signal from the antenna 2 into a signal that can be processed by the coder-decoder. In transmission, on the other hand, it performs a process of modulating a digital signal resulting from conversion at the coder-decoder, into a signal that can be carried on the carrier wave. The coder-decoder is comprised of a codec (CODEC), which performs a process (decoding) of converting an input digital signal from the modulator-demodulator into an analog signal in reception. In transmission, on the other hand, it performs a process (coding) of converting an analog signal of a sound signal or the like into a digital signal, and compresses the converted digital signal into a signal of data volume suitable for transmission.

The control unit 4 reads out a program preliminarily recorded in ROM (not shown) and exercises general control over each of the components according to the program. For example, on the occasion of executing a cell transfer process described hereinafter, the control unit 4 determines whether the broadcast information received from the base station B1 is identical with the broadcast information received from the base station B2. The control unit 4 also executes a process of selecting a transfer target cell and making a transfer to the cell.

The storage unit 5 is comprised of a cell information storage table 51 and a broadcast information storage area 52. A specific data storage example will be described later, and the cell information storage table 51 has at least a scrambling code storage area 51a, a value-tag storage area 51b, and a cell ID storage area 51c. A scrambling code herein is an identification code of a sector constituting a cell. The three types of data of the scrambling code, value-tag, and cell ID will be hereinafter referred to together as "cell information."

The broadcast information storage area 52 has at least an area for storing the broadcast information constituent data A including value-tags, in correspondence with the value-tags, and an area for storing the broadcast information constituent data B including cell IDs, in correspondence with the cell IDs.

The sound processing unit 6 is provided with the microphone M and the speaker S. The sound processing unit 6 converts a sound wave into a sound signal by the microphone M and outputs the sound signal to the transmitter-receiver 3. The sound processing unit 6 amplifies an input sound signal from the transmitter-receiver 3 through an amplifier (not shown), converts the amplified signal into a sound wave, and outputs the sound wave from the speaker S to the outside.

Figure 3:
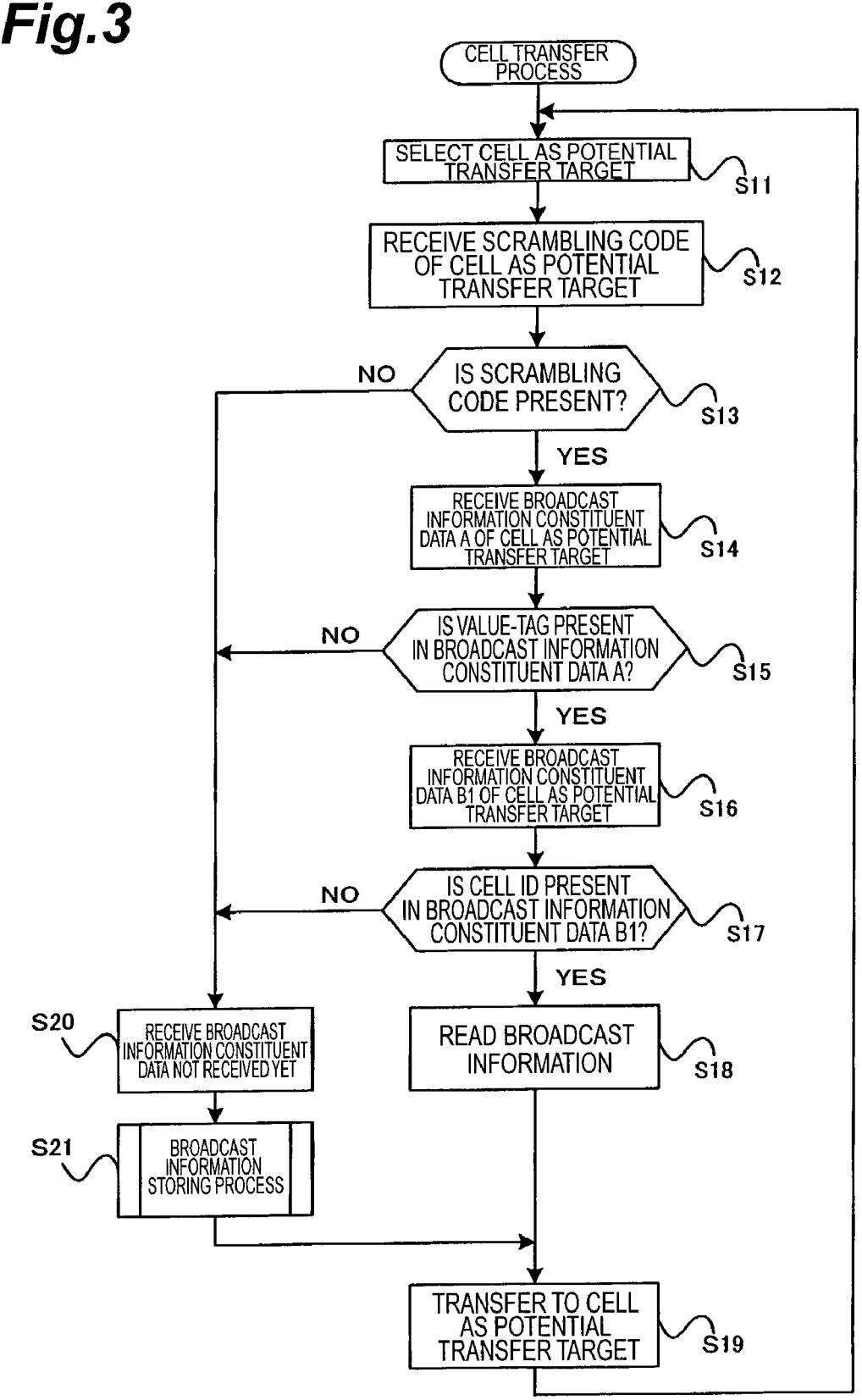
FIG. 3 is a flowchart for explaining the cell transfer process in the first embodiment.

The operation will be described next. The cell transfer process in the first embodiment will be described below with reference to FIG. 3.

At the first step S11, the mobile phone 1 selects a cell as a potential transfer target, based on reception levels. Then the mobile phone 1 receives a scrambling code from a base station having the selected cell as a communication area (S12).

At the next step, the mobile phone 1 determines whether a scrambling code identical with the scrambling code received at S12 is stored in the scrambling code storage area 51a (S13).

When at S13 the same scrambling code is stored (S13; YES), the mobile phone 1 receives the broadcast information A from the base station having the cell selected at S11, as a communication area (S14). When at S13 the same scrambling code is not stored on the other hand (S13; NO), the mobile phone transfers to processing at and after S20 described hereinafter.

At S15, the mobile phone 1 extracts the value-tag from the broadcast information A received at S14. The mobile phone 1 determines whether a value-tag identical with the extracted value-tag is stored in the value-tag storage area 51b.

When at S15 the same value-tag is stored (S15; YES), the mobile phone 1 receives the broadcast information B1 from the base station having the cell selected at S11, as a communication area (S16). When at S15 the same value-tag is not stored on the other hand (S15; NO), the mobile phone transfers to the processing at and after S20 described hereinafter.

At S17, the mobile phone 1 extracts the cell ID from the broadcast information B1 received at S16. The mobile phone 1 determines whether a cell ID identical with the extracted cell ID is stored in the cell ID storage area 51c.

When at S17 the same cell ID is stored (S17; YES), the mobile phone 1 determines that the broadcast information (the broadcast information constituent data A group and the broadcast information constituent data B group) stored in the broadcast information storage area 52 can be used as the broadcast information of the cell selected at S11. Then the mobile phone 1 reads the broadcast information constituent data A group corresponding to the value-tag extracted at S15 and the broadcast information constituent data B group corresponding to the cell ID extracted at S17, out of the broadcast information storage area 52 (S18).

At the next step S19, the mobile phone 1 performs the cell transfer process to the cell according to the broadcast information constituent data A group and the broadcast information constituent data B group (i.e., the broadcast information) read at S18. After completion of the cell transfer, the mobile phone returns to Sit and executes the processing thereafter.

Each of the processes at S20–S21 will be described below. The processes at S20–S21 are executed when the mobile phone 1 determines that it does not store the broadcast information necessary for the cell transfer. Namely, the processes are executed when the cell information storage table 51 does not include even one of the scrambling code, the value-tag, and the cell ID of the cell selected at S11.

At S20, the mobile phone 1 receives all the data included in the broadcast information of the cell selected at S11. At the last step S21, the mobile phone 1 executes a broadcast information storing process.

Figure 4:
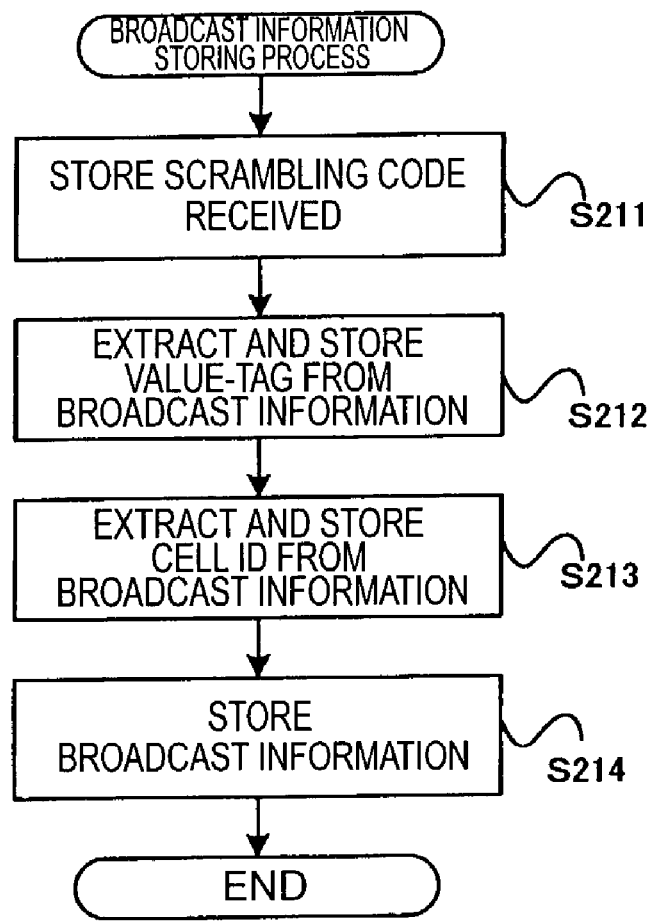
FIG. 4 is a flowchart for explaining the broadcast information storing process in the first embodiment.

The broadcast information storing process in the first embodiment will be described below with reference to FIG. 4. At S211, the mobile phone 1 stores the scrambling code received at S12, in the scrambling code storage area 51a. At next S212, the mobile phone 1 extracts the value-tag out of the broadcast information constituent data A received at S14 or S20 and stores it in the value-tag storage area 51b. Likewise, at S213, the mobile phone 1 extracts the cell ID out of the broadcast information constituent data B1 received at S16 or S20 and stores it in the cell ID storage area 51c. At the last step S214, the mobile phone 1 stores the broadcast information in the broadcast information storage area 52 in correspondence with the scrambling code, the value-tag, and the cell ID received.

Referring back to FIG. 3, after completion of the execution of the broadcast information storing process, the mobile phone 1 performs the cell transfer process to the cell according to the broadcast information received at S20 (S19). After completion of the cell transfer, the mobile phone returns to S11 and executes the processing thereafter. The cell transfer process means that the mobile phone 1 switches the base station as a communication correspondent to another, so as to change the cell used by the mobile phone 1 to another. The switching of the base station embraces switching to a base station configured as a separate station and also embraces switching between communication systems (operating frequency bands, modulation and demodulation methods, coding and decoding methods, etc.) in a single base station.

Figure 5:
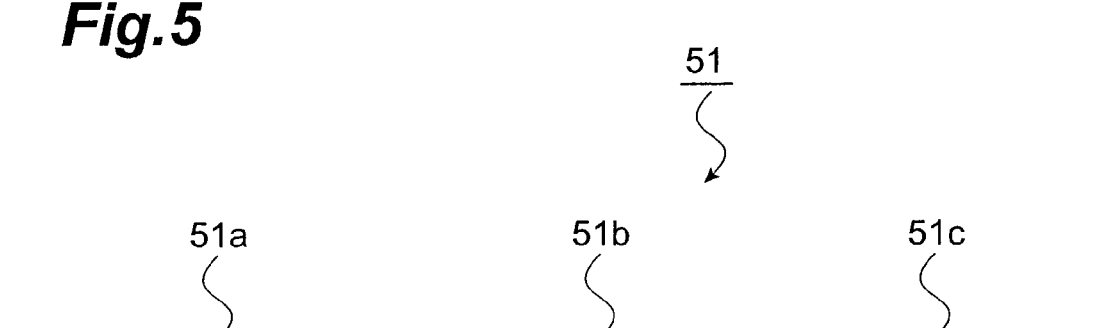
FIG. 5 is a diagram showing a data storage example inside the cell information storage table 51 in the first embodiment.

FIG. 5 is a diagram showing a data storage example in the cell information storage table 51 after the execution of the broadcast information storing process. As shown in FIG. 5, the cell information storage table 51 consists of the scrambling code storage area 51a, the value-tag storage area 51b, and the cell ID storage area 51c, and stores the data of scrambling codes, value-tags, and cell IDs in correspondence with each other.

The scrambling code storage area 51a stores data items uniquely allocated for identification of the respective scrambling codes (e.g., "#1," "#2," "#3," "#2,", "#2," . . . ), as "scrambling codes" in a historical way.

The value-tag storage area 51b stores data items uniquely allocated for identification of the respective value-tags (e.g., "#A," "#B," "#B," "#D," "#D," . . . ), as "value-tags" in a historical way.

Similarly, the cell ID storage area 51c stores data items allocated for identification of the respective cell IDs (e.g., "#10," "#15," "#22," "#56," "#15," . . . ), as "cell IDs" in a historical way.

As described above, the mobile phone 1 in the first embodiment is configured so that only when in execution of the cell transfer process the broadcast information storage area 52 stores the broadcast information identical in all the data of the scrambling code, value-tag, and cell ID of the first cell, the mobile phone reads out the broadcast information and makes the transfer to the cell. In the execution of the broadcast information storing process, a plurality of broadcast information items received on the occasion of cell transfers are stored in a historical way in correspondence with the scrambling codes.

Namely, the mobile phone 1 in the first embodiment first determines the identity between the broadcast information of the cell as a potential transfer target and the previously stored broadcast information and then determines whether the previously stored broadcast information should be reused as the broadcast information before reception. This configuration decreases the volume of data received on the occasion of the cell transfer and shortens the receiving time. Since the cell transfer is finished after completion of reception of the broadcast information, the shortening of the receiving time leads to decrease of the cell transfer time. Furthermore, the time of use of the data reception channel becomes shorter, which can decrease the power consumption of the mobile phone 1.

When the mobile phone 1 does not store the scrambling code identical with the received scrambling code, it determines that there is no identical broadcast information at the time of receiving the scrambling code, and receives all the constituent data of the broadcast information of the cell as a potential transfer target. Therefore, there is no need for performing the processes of determining the identity of the value-tag and cell ID, so that waste data reception can be avoided, as compared with the case where the scrambling code is not used for the determination of identity. The present embodiment also provides the advantage that it is feasible to curtail the time for the waste data reception.

Furthermore, the decrease of the reception time of broadcast information also results in presenting the following effects. For example, in the case where the mobile phone 1 makes a cell transfer during packet communication through the use of a common channel, the packet communication has to be interrupted once. In this case, for a restart of communication after completion of the cell transfer, the mobile phone has to receive the broadcast information and send a signal notifying of the cell transfer, to the base station. However, if the notification signal is sent after reception of all the constituent data of broadcast information, a signal delay will occur. The occurrence of the signal delay can be successfully restrained by decreasing the reception time of broadcast information and shortening the time of interruption of packet communication.

Second Embodiment

The second embodiment of the present invention will be described below. The configuration will be described first. The basic configuration of the mobile communication system in the present embodiment is much the same as the configuration of the mobile communication system 100 in the first embodiment. Therefore, the components will be denoted by the same reference symbols and the description thereof will be omitted. The following will thus detail only differences from the first embodiment.

The storage unit 5 has an effective time storage area 53. The effective time storage area 53 stores effective time data. The effective time data is numerical data indicating a time from a time point when the mobile phone 1 receives broadcast information, to a time point when the broadcast information becomes of no effect.

A specific data storage example will be presented later, and the cell information storage table 51 has at least the scrambling code storage area 51*a*, the value-tag storage area 51*b*, and an elapsed time storage area 51*d*. In the present embodiment the cell information storage table 51 does not have the cell ID storage area 51*c*.

Figure 6:
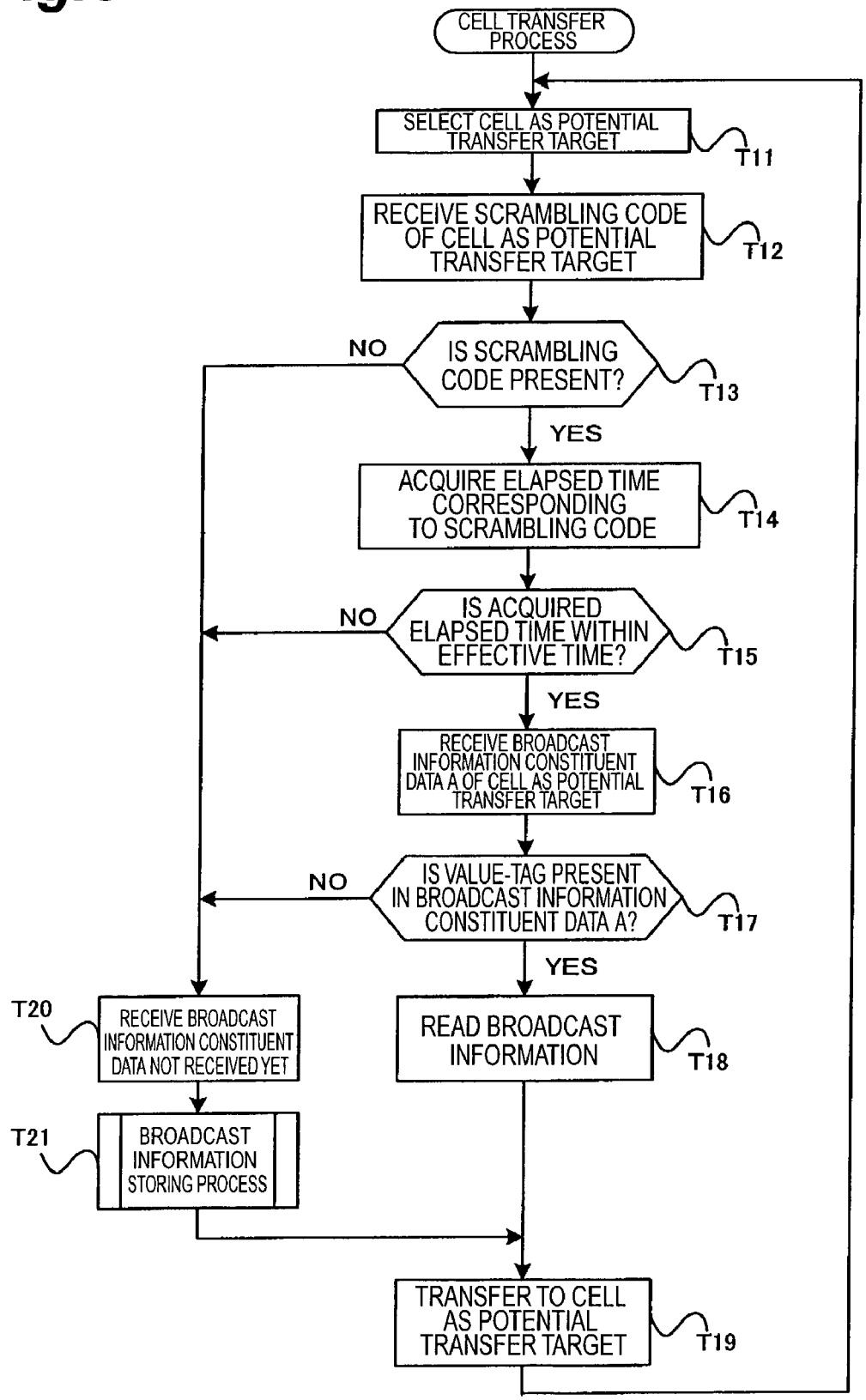
FIG. 6 is a flowchart for explaining the cell transfer process in the second embodiment.

The operation will be described below. The cell transfer process in the second embodiment will be described below with reference to FIG. 6. The processes at T11–T13, T16–T17, and T18–T20 shown in FIG. 6 are the same as the corresponding processes at S11–S13, S14–S15, and S18–S20 (cf. FIG. 3) as detailed in the first embodiment, and only the processes at T14–T15, and T21 different from the first embodiment will be described below.

Specifically, at T14, the mobile phone 1 acquires the elapsed time data corresponding to the scrambling code received at T12, from the elapsed time storage area 51*d*. At next T15, the mobile phone 1 acquires the effective time data from the effective time storage area 53 and compares the effective time data with the elapsed time data acquired at T14.

If the result of the comparison is that the elapsed time is within the effective time (T15; YES), the mobile phone 1 determines that the cell information and broadcast information corresponding to the elapsed time data acquired at T14 is effective, and then transfers to T16. When the elapsed time is over the effective time on the other hand (T15; NO), the mobile phone 1 determines that the cell information and broadcast information corresponding to the elapsed time data acquired at T14 is of no effect, and then transfers to T20.

Figure 7:
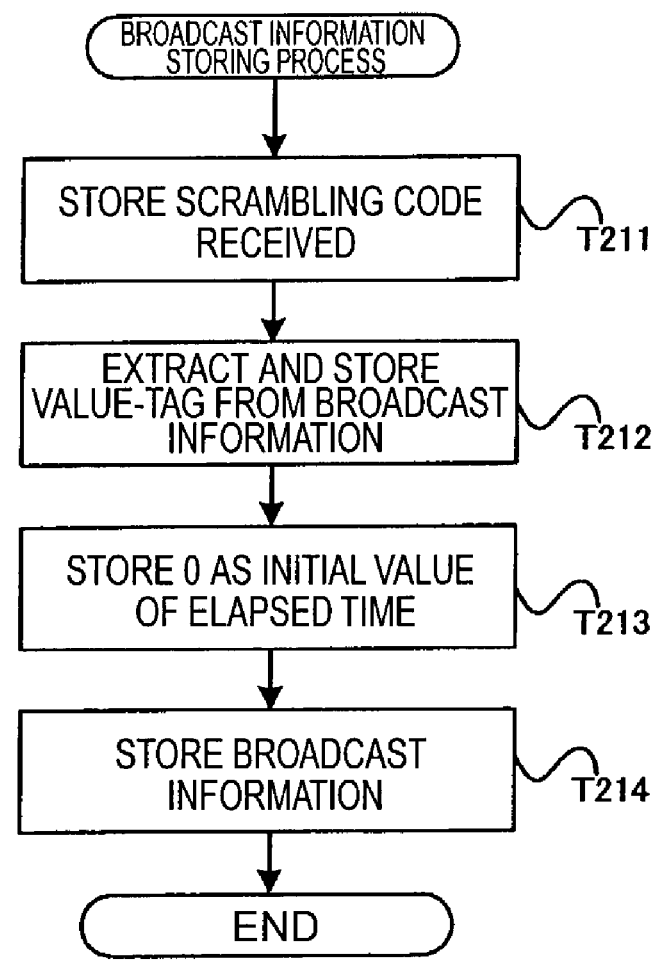
FIG. 7 is a flowchart for explaining the broadcast information storing process in the second embodiment.

The broadcast information storing process (T21) in the second embodiment will be described below with reference to FIG. 7. Since the processes at T211–T212, and T214 shown in FIG. 7 are the same as the corresponding processes at S211–S212, and S214 (cf. FIG. 4) as detailed in the first embodiment, only the process at T213 different from the first embodiment will be described. At T213, the mobile phone 1 stores "0" as an initial value of the elapsed time data in the elapsed time storage area 51*d*, because it starts clocking of elapsed time from a start point at the time of reception of the broadcast information. The mobile phone 1 stores the elapsed time data in correspondence with the broadcast information received at T20. The elapsed time data thus stored is dynamic data automatically updated with a lapse of time.

After the execution of the broadcast information storing process, the cell information storage table 51 is, for example, in the state shown in the data storage example in FIG. 8. Namely, the cell information storage table 51 consists of the scrambling code storage area 51*a*, the value-tag storage area 51*b*, and the elapsed time storage area 51*d*, and stores the data of scrambling codes, value-tags, and elapsed times in correspondence with each other.

The elapsed time storage area 51*d* stores updatable numerical data items indicating respective elapsed times from the time point of reception of broadcast information at the mobile phone 1 (e.g., "30," "28," "15," "10," "8," . . . ), as "elapsed times" in a historical way. The hatching in FIG. 8 is provided in order to show the definite distinction from the first embodiment, and indicates that the data is invalid, in the case where the effective time is set at 20. The data storage forms in the scrambling code storage area 51*a* and in the value-tag storage area 51*b* are the same as in the first embodiment and the description thereof is thus omitted herein.

As described above, the mobile phone 1 in the second embodiment is configured so that, only when in execution of the cell transfer process the identity is confirmed for both the scrambling code and the value-tag of the first cell and the elapsed time is within the effective time, it reads out the corresponding broadcast information and transfers to the cell. In the execution of the broadcast information storing process, a plurality of broadcast information items received on the occasion of cell transfers are stored in a historical way in correspondence with the scrambling codes and elapsed times.

Namely, the mobile phone 1 in the second embodiment first determines the identity between the broadcast information of the cell as a potential transfer target and the previously stored broadcast information, and the validity of the previously stored broadcast information, and then determines whether the previously stored broadcast information should be reused as broadcast information before reception. Accordingly, improvement can be made in reliability of the identity determining process, as compared with the mobile phone 1 in the first embodiment.

Particularly, the reason why the effective time is added as the identity determining condition of broadcast information, is as follows. Namely, there are cases where the broadcast information is identical in part between different cells, and in such cases, the above configuration prevents the mobile phone 1 from making a wrong decision that different cells are judged as an identical cell.

More specifically, when the elapsed time corresponding to the first cell is within the predetermined time, the time since the transfer from the first cell is expected to be short. For this reason, in the case of scrambling codes being identical, there is a high possibility that a cell as a potential transfer cell is the first cell. Therefore, an adequate cell transfer can be made even if the broadcast information corresponding to the first cell is read out and used.

In contrast to it, when the elapsed time corresponding to the first cell is over the predetermined time, the time since the transfer from the first cell is expected to be long (i.e., the mobile phone is apart in distance from the first cell). For this reason, even if scrambling codes are identical, a cell as a potential transfer target is not always the first cell. In such cases, if the broadcast information corresponding to the first cell is read out and used, the cell transfer will be made according to the broadcast information different from the broadcast information of the cell as a transfer target, and the mobile phone will fail to make an adequate cell transfer. Therefore, in order to avoid such inconvenience, the cell identity criterion is provided separately from the scrambling code and cell ID.

At T15 in the cell transfer process of the present embodiment, the mobile phone 1 may be configured to delete the cell information judged as invalid, from the cell information storage table 51 and delete the broadcast information judged as invalid, from the broadcast information storage area 52. This configuration can save used data capacity in the cell information storage table 51 and in the broadcast information storage area 52. As a consequence, it becomes feasible to store the larger number of effective cell information and broadcast information.

Third Embodiment

The third embodiment of the present invention will be described below. The present embodiment is a composite form of the first embodiment and the second embodiment described above. The configuration will be described first. The basic configuration of the mobile communication system in the present embodiment is much the same as the configuration of the mobile communication system 100 in the first embodiment and the second embodiment. Therefore, the components are denoted by the same reference symbols and the description thereof is omitted herein. The following will detail only differences from the first embodiment or the second embodiment.

A specific data storage example will be described later, and the cell information storage table 51 has at least the scrambling code storage area 51a, the value-tag storage area 51b, the cell ID storage area 51c, and the elapsed time storage area 51d.

Figure 9:
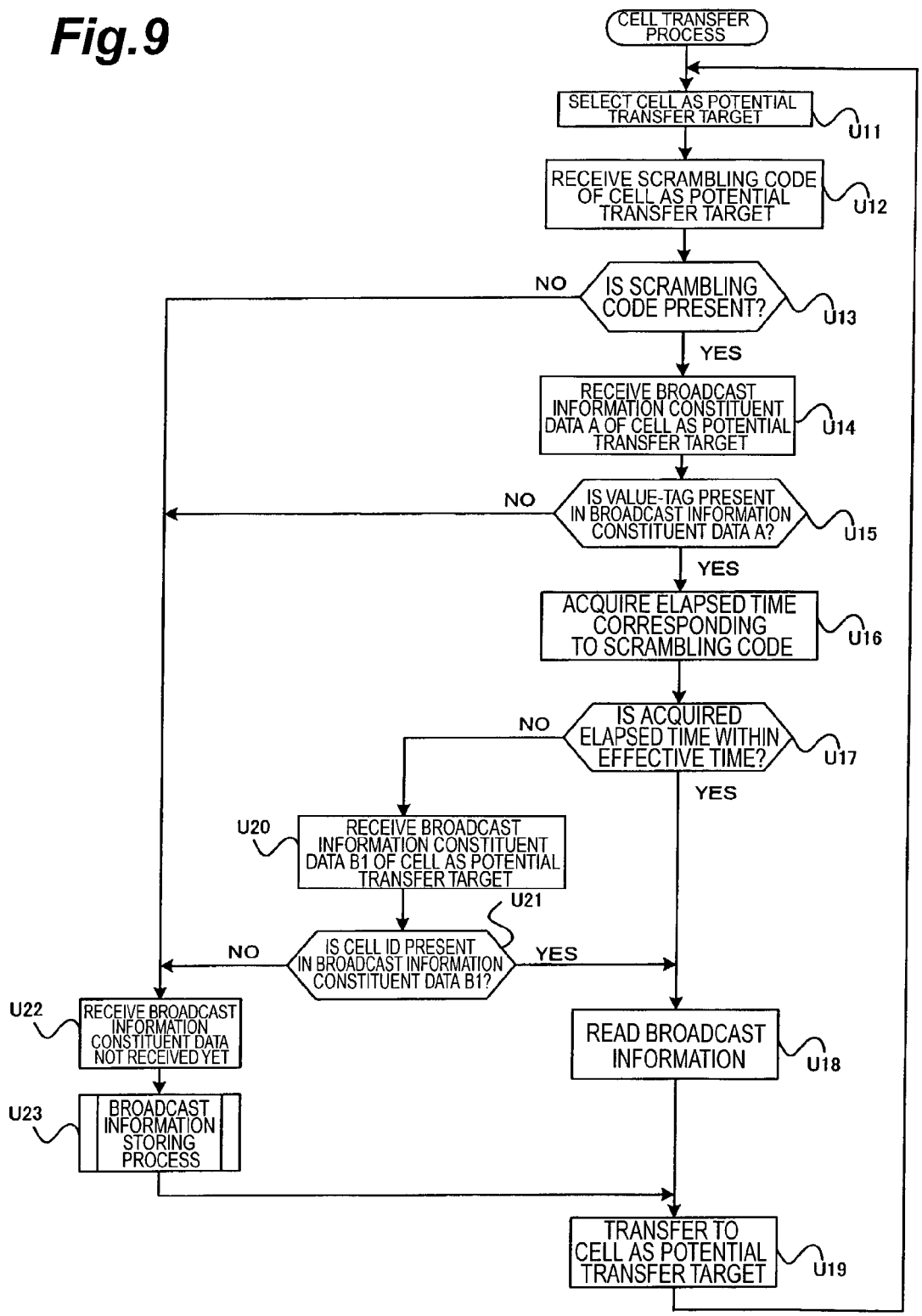
FIG. 9 is a flowchart for explaining the cell transfer process in the third embodiment.

The operation will be described next. The cell transfer process in the third embodiment will be described below with reference to FIG. 9. The processes at U11–U15, U18–U19, U20–U21, and U22 shown in FIG. 9 are the same as the respective processes at S11–S15, S18–S19, S16–S17, and S20 (cf. FIG. 3) as detailed in the first embodiment. The processes at U16–U17 shown in FIG. 9 are the same as the respective processes at T14–T15 as detailed in the second embodiment (cf. FIG. 6).

Accordingly, the detailed description of each of the above steps is omitted herein, but the cell transfer process in the third embodiment is different in the following point from the first and second embodiments. Namely, even in the case where at U17 the elapsed time of the broadcast information received at the mobile phone 1 is over the effective time, the mobile phone executes the reading process of broadcast information (U18) if the cell ID of the cell is stored in the cell ID storage area 51c.

Figure 10:
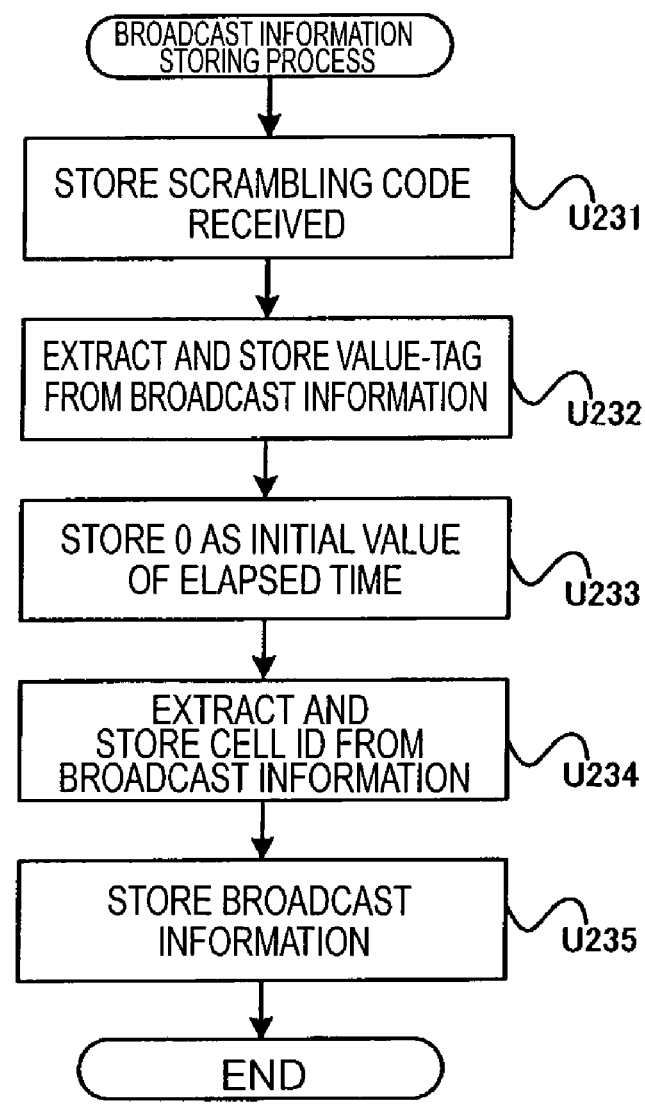
FIG. 10 is a flowchart for explaining the broadcast information storing process in the third embodiment.

The broadcast information storing process (U23) in the third embodiment will be described below with reference to FIG. 10. The processes at U231–U232, and U234–U235 shown in FIG. 10 are the same as the respective processes at S211–S212, and S213–S214 (cf. FIG. 4) described in the first embodiment. The process at U233 shown in FIG. 10 is the same as the process at T213 (cf. FIG. 7) detailed in the second embodiment. Therefore, the detailed description of each data storage area is omitted herein.

Figure 11:
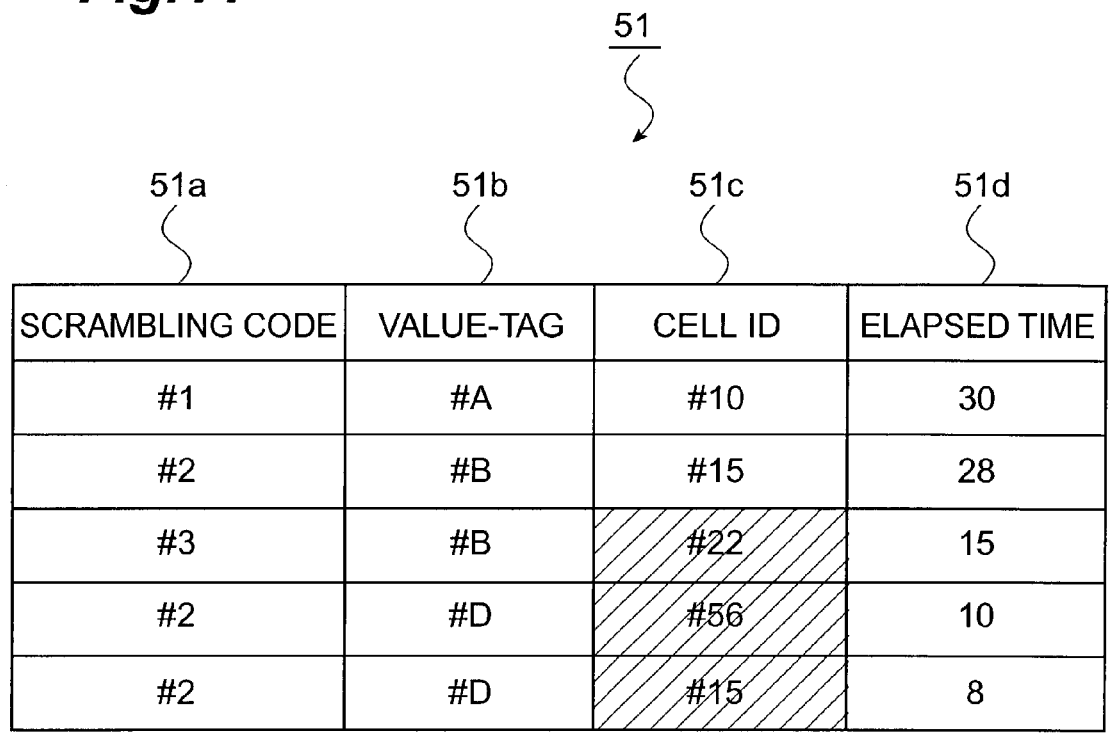
FIG. 11 is a diagram showing a data storage example inside the cell information storage table 51 in the third embodiment.

After the execution of the broadcast information storing process, the cell information storage table 51 is, for example, in the state shown in the data storage example in FIG. 11. Namely, the cell information storage table 51 consists of the scrambling code storage area 51a, the value-tag storage area 51b, the cell ID storage area 51c, and the elapsed time storage area 51d, and stores the data of scrambling codes, value-tags, cell IDs, and elapsed times in correspondence with each other.

The data storage forms in the scrambling code storage area 51a, the value-tag storage area 51b, and the cell ID storage area 51c are the same as those in the first embodiment, and the description thereof is omitted herein. The data storage form in the elapsed time storage area 51d is the same as the storage form of elapsed time data in the second embodiment, and the description thereof is omitted herein. The hatching in FIG. 11 is provided for showing the definite distinction from the first embodiment, and indicates data unused in the case where the effective time is set at 20.

As described above, the mobile phone 1 in the third embodiment is configured so that, when in execution of the cell transfer process the identity is confirmed for both the scrambling code and the value-tag of the first cell and the elapsed time is within the effective time, it reads out the corresponding broadcast information and transfers to the cell. Furthermore, even in the case where the elapsed time is over the effective time, the mobile phone reads out the corresponding broadcast information and transfers to the cell if the cell ID is identical with the stored one. This configuration prevents the mobile phone 1 from performing the determination of the identity of cell using the cell ID even in the case where the identity of cell can be determined based on the elapsed time. As a consequence, the cell identity can be determined by minimum processing. In the execution of the broadcast information storing process, a plurality of broadcast information items received on the occasion of cell transfers are stored in a historical way in correspondence with the scrambling codes and elapsed times.

Namely, the mobile phone 1 in the third embodiment is configured to determine whether the previously stored broadcast information should be reused as broadcast information before reception, in consideration of validity of the previously stored broadcast information and quickness of the identity determining process. Accordingly, it becomes feasible to achieve a quicker cell transfer while maintaining the reliability of the identity determining process.

The things described in each of the above embodiments are just of the preferred example of the mobile communication system according to the present invention, and the present invention is not limited thereto.

For example, each of the above embodiments exemplified the scrambling codes as information for the mobile phone 1 to identify the cells, and this is based on the assumption that the radio communication system of the mobile phone 1 is CDMA (Code Division Multiple Access). Frequencies are used in the case of mobile phones whose radio communication system is the PDC (Personal Digital Cellular) system.

Furthermore, the mobile communication terminal was described as a mobile phone in each of the above embodiments, but it may be any information equipment with the radio communication function like PHS (Personal Handyphone System) and the like.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile communication terminal comprising:
   cell information storing means for storing a plurality of broadcast information items received on the occasion of cell transfers, in a historical way in correspondence with a plurality of cell identifying information items for identifying respective cells;
   cell information receiving means for receiving a cell identifying information item for identifying a cell;
   identity determining means for determining whether one of the plurality of cell identifying information items stored in said cell information storing means is identical with the cell identifying information item received by said cell information receiving means;

broadcast information acquiring means for, when said identity determining means determines that one of the plurality of cell identifying information items stored in said cell information storing means is identical with the cell identifying information item received by said cell information receiving means, acquiring a broadcast information item corresponding to the cell identifying information item determined as identical, from said cell information storing means; and cell transfer means for carrying out a transfer to the cell, based on the broadcast information item acquired by said broadcast information acquiring means, wherein said cell information storing means stores a plurality of broadcast information items received on the occasion of cell transfers, in a historical way in correspondence with elapsed times since received, and wherein when an elapsed time as mentioned is within a predetermined time, said broadcast information acquiring means acquires a broadcast information item corresponding to said elapsed time, from said cell information storing means.

2. A cell transfer method of carrying out a cell transfer of a mobile communication terminal while receiving broadcast information from a base station, said cell transfer method comprising:

a cell information storing step of storing a plurality of broadcast information items received on the occasion of cell transfers, in a historical way in storing means, in correspondence with a plurality of cell identifying information items for identifying respective cells;

a cell information receiving step of receiving cell identifying information for identifying a cell;

an identity determining step of determining whether one of the plurality of cell identifying information items stored in said cell information storing step is identical with the cell identifying information item received in said cell information receiving step;

a broadcast information acquiring step of, when said identity determining step results in determining that one of the plurality of cell identifying information items stored in said cell information storing step is identical with the cell identifying information item received in said cell information receiving step, acquiring a broadcast information item corresponding to the cell identifying information item determined as identical, from said storing means; and a cell transfer step of carrying out a transfer to the cell, based on the broadcast information item acquired in said broadcast information acquiring step, wherein said cell information storing step is to store a plurality of broadcast information items received on the occasion of cell transfers, in a historical way in correspondence with elapsed times since received, and wherein said broadcast information acquiring step is to, when an elapsed time is within a predetermined time, acquire a broadcast information item corresponding to said elapsed time.

3. A mobile communication terminal, comprising:

broadcast information storing means for storing, in a historical way, a plurality of broadcast informations each being associated with a cell identifying information for identifying the relevant cell that are received in the past on the occasion of cell transfers; and determining means for receiving a cell identifying information and determining whether a current base station, from which said mobile communication terminal is currently receiving the cell identifying information, is identical to a past base station that has transmitted the broadcast information stored in said broadcast information storing means, wherein said mobile communication terminal receives the broadcast information from the current base station when said determining means determines that the past base stations is not identical to the current base station, and on the other hand, when said determining means determines that the past base station is identical to the current base station, reuses the broadcast information associated with the past base station and stored in said broadcast information storing means as a broadcast information of the current base station.

4. The mobile communication terminal according to claim 3 comprising:

second determining means for receiving a part of the broadcast information and determining whether the content of the broadcast information has been changed or not, wherein said mobile communication terminal reuses the broadcast information stored in said broadcast information storing means only when said second determining means determines that the content of broadcast information has not been changed.

5. The mobile communication terminal according to claim 3 or 4:

wherein the cell identifying information is a scrambling code for the modulation of the broadcast information.

6. The mobile communication terminal according to claim 5:

wherein, after receiving a cell identification item (cell ID) that is unique to a particular cell and contained in the broadcast information, said determining means determines that the current base station is identical to the past base station when the cell identification items thereof, in addition to the scrambling codes thereof, coincide.

7. The mobile communication terminal according to claim 6:

wherein said broadcast information storing means receives and stores a remainder of the broadcast information items when said determining means determines that the past base station is identical to the current base station.

8. The mobile communication terminal according to claim 5:

wherein said determining means counts the time that has elapsed since the scrambling code was received and stored in said broadcast information storing means, and wherein said determining means determines that the current base station is identical to the past base station when the scrambling codes thereof coincide and also the time counted by said determining means is within a threshold time period.

9. The mobile communication terminal according to claim 8:

wherein said determining means determines that the current base station is identical to the past base station, upon being judged that the time counted by said determining means is not within the threshold time period and receiving a cell identification item that is unique to a particular cell and contained in the broadcast information, when the cell identification items thereof, in addition to the scrambling codes thereof, coincide.

10. A mobile communication method, comprising:
  storing, in a historical way, a plurality of broadcast informations each being associated with a cell identifying information for identifying the relevant cell that are received in the past on the occasion of cell transfers; and
  receiving a cell identifying information and determining whether a current base station, from which said mobile communication terminal is currently receiving the cell identifying information, is identical to a past base station that has transmitted the broadcast informations stored in said broadcast information storing step,
  wherein said mobile communication terminal receives the broadcast information from the current base station when said determining step determines that the past base stations is not identical to the current base station, and on the other hand, when said determining step determines that the past base station is identical to the current base station, reuses the broadcast information associated with the past base station and stored in said storing step as a broadcast information of the current base station.

11. The mobile communication method according to claim 10 comprising:
  a second step of determining including receiving a part of the broadcast information and determining whether the content of the broadcast information has been changed or not,
  wherein said mobile communication terminal reuses the broadcast information stored in said storing step only when said second step of determining determines that the content of broadcast information has not been changed.

12. The mobile communication method according to claim 10 or 11:
  wherein the cell identifying information is a scrambling code for the modulation of the broadcast information.

13. The mobile communication method according to claim 12:
  wherein, after receiving a cell identification item (cell ID) that is unique to a particular cell and contained in the broadcast information, said determining step includes determining that the current base station is identical to the past base station when the cell identification items thereof, in addition to the scrambling codes thereof, coincide.

14. The mobile communication method according to claim 13:
  wherein said step of storing includes receiving and storing a remainder of the broadcast information items when said step of determining determines that none of the past base stations is identical to the current base station.

15. The mobile communication method according to claim 12:
  wherein said step of determining includes counting the time that has elapsed since the scrambling code was received and stored in said step of storing, and
  wherein said step of determining includes determining that the current base station is identical to the past base station when the scrambling codes thereof coincide and also the time counted by said step of determining is within a threshold time period.

16. The mobile communication method according to claim 15:
  wherein said step of determining includes determining that the current base station is identical to the past base station, upon being judged that the time counted by said step of determining is not within the threshold time period and receiving a cell identification item that is unique to a particular cell and contained in the broadcast information, when the cell identification items thereof, in addition to the scrambling codes thereof, coincide.

17. A mobile communication terminal comprising:
  broadcast information storage device configured to store, in a historical way, a plurality of broadcast informations each being associated with a cell identifying information for identifying the relevant cell that are received in the past on the occasion of cell transfers; and
  a determination unit configured to receive a cell identifying information and to determine whether a current base station, from which said mobile communication terminal is currently receiving the cell identifying information, is identical to a past base station that has transmitted the broadcast informations stored in said broadcast information storing device,
  wherein said mobile communication terminal is configured to receive the broadcast information from the current base station when said determination unit determines that none of the past base stations is identical to the current base station, and on the other hand, when said determination unit determines that one of the past base station is identical to the current base station, is configured to reuse the broadcast information associated with the past base station and stored in said broadcast information storing device as a broadcast information of the current base station.

18. The mobile communication terminal according to claim 17 comprising:
  a second determination unit configured to receive a part of the broadcast information and determine whether the content of the broadcast information has been changed or not,
  wherein said mobile communication terminal reuses the broadcast information stored in said broadcast information storing device only when said second determination unit determines that the content of broadcast information has not been changed.

19. The mobile communication terminal according to claim 17 or 18:
  wherein the cell identifying information is a scrambling code for the modulation of the broadcast information.

20. The mobile communication terminal according to claim 19:
  wherein, after receiving a cell identification item (cell ID) that is unique to a particular cell and contained in the broadcast information, said determination unit determines that the current base station is identical to the past base station when the cell identification items thereof, in addition to the scrambling codes thereof, coincide.

21. The mobile communication terminal according to claim 20:
  wherein said broadcast information storing device receives and stores a remainder of the broadcast information items when said determination unit determines that the past base stations is not identical to the current base station.

22. The mobile communication terminal according to claim 19:
  wherein said determination unit is configured to count the time that has elapsed since the scrambling code was received and stored in said broadcast information storing device, and wherein said determination unit is configured to determine that the current base station is identical to the past base station when the scrambling codes thereof coincide and also the time counted by said determination device is within a threshold time period.

23. The mobile communication terminal according to claim 22:
wherein said determination unit is configured to determine that the current base station is identical to the past base station, upon being judged that the time counted by said determination unit is not within the threshold time period and receiving a cell identification item that is unique to a particular cell and contained in the broadcast information, when the cell identification items thereof, in addition to the scrambling codes thereof, coincide.

* * * * *